US012365448B2

(12) United States Patent
Myoren et al.

(10) Patent No.: US 12,365,448 B2
(45) Date of Patent: Jul. 22, 2025

(54) AIRCRAFT

(71) Applicant: MITSUBISHI HEAVY INDUSTRIES, LTD., Tokyo (JP)

(72) Inventors: Chihiro Myoren, Tokyo (JP); Yuji Koike, Tokyo (JP); Kazuhiro Imai, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 18/564,928

(22) PCT Filed: Jul. 8, 2022

(86) PCT No.: PCT/JP2022/027138
§ 371 (c)(1),
(2) Date: Nov. 28, 2023

(87) PCT Pub. No.: WO2023/008150
PCT Pub. Date: Feb. 2, 2023

(65) Prior Publication Data
US 2024/0286740 A1    Aug. 29, 2024

(30) Foreign Application Priority Data
Jul. 26, 2021  (JP) ................................. 2021-121844

(51) Int. Cl.
*B64C 21/01* (2023.01)
*B64D 27/02* (2006.01)

(52) U.S. Cl.
CPC ............. *B64C 21/01* (2023.01); *B64D 27/02* (2013.01)

(58) Field of Classification Search
CPC ...... B64C 21/01; B64C 21/06; B64C 2230/06; B64D 33/02
See application file for complete search history.

(56) References Cited

U.S. PATENT DOCUMENTS 5,417,391 A * 5/1995 Savitsky ............... B64C 21/06
244/209
6,004,095 A * 12/1999 Waitz ..................... F02K 1/28
415/115

(Continued)

OTHER PUBLICATIONS

International Search Report issued in corresponding International Application No. PCT/JP2022/027138 mailed Sep. 20, 2022 (4 pages).

(Continued)

*Primary Examiner* — Joshua D Huson
*Assistant Examiner* — Peter A Taraschi
(74) *Attorney, Agent, or Firm* — Osha Bergman Watanabe & Burton LLP (57) ABSTRACT

An aircraft includes a fuselage body extending in a front-rear direction; a tail wing at a rear portion of the fuselage body in the front-rear direction; a main wing in front of the tail wing in the front-rear direction on the fuselage body; and a fan device on an outer surface of the fuselage body. The fan device includes a rotor shaft outside the outer surface of the fuselage body, a rotor blade on an outer side of the rotor shaft in a rotor radial direction with the rotor shaft as a center, a housing fixed to the fuselage body, extending in the front-rear direction, including respective openings at a front and a rear in the front-rear direction, and provided to cover the rotor shaft and the rotor blade, a stator blade.

6 Claims, 6 Drawing Sheets (56) References Cited

U.S. PATENT DOCUMENTS

| | | | | |
|---|---|---|---|---|
| 8,192,147 | B2* | 6/2012 | Haas | B64D 33/02 |
| | | | | 415/144 |
| 8,282,341 | B2* | 10/2012 | Freeman | F01D 5/145 |
| | | | | 415/168.1 |
| 10,480,531 | B2* | 11/2019 | Shibata | F04D 29/542 |
| 11,828,237 | B2* | 11/2023 | Saripella | F04D 27/009 |
| 2008/0112799 | A1* | 5/2008 | Winter | F02C 7/047 |
| | | | | 415/145 |
| 2018/0051716 | A1* | 2/2018 | Cheung | H02K 7/1823 |
| 2018/0208297 | A1 | 7/2018 | Ramakrishnan et al. | |
| 2020/0141262 | A1* | 5/2020 | Schrewe | F01D 17/085 |
| 2020/0189724 | A1* | 6/2020 | Terwilliger | B64C 21/01 |
| 2022/0355916 | A1* | 11/2022 | Gottapu | B64D 27/402 |

OTHER PUBLICATIONS

Written Opinion issued in corresponding International Application No. PCT/JP2022/027138 mailed Sep. 20, 2022 (6 pages).

* cited by examiner

AIRCRAFT

TECHNICAL FIELD

The present disclosure relates to an aircraft.

Priority is claimed on Japanese Patent Application No. 2021-121844, filed on Jul. 26, 2021, the content of which is incorporated herein by reference.

BACKGROUND ART

For example, PTL 1 discloses an aircraft including a boundary layer injection (BLI) fan. The BLI fan of PTL 1 is disposed at a position behind a main wing and a propulsion engine of the aircraft. The BLI fan includes a tubular nacelle provided on a radial outer side of a fuselage, and a fan rotatable between the nacelle and the fuselage. The BLI fan generates an air flow by rotating the fan between the nacelle and the fuselage, and suctions a boundary layer formed on a surface of the fuselage of the aircraft, into the nacelle using the air flow. In addition, the BLI fan obtains thrust by blowing the air flow rearward from inside the nacelle in a propulsion direction of the fuselage. As described above, the BLI fan improves the propulsion efficiency of the aircraft by taking in the air of the boundary layer and by obtaining the thrust.

CITATION LIST

Patent Literature

[PTL 1] US Unexamined Patent Application Publication No. 2018/0208297 Specification

SUMMARY OF INVENTION

Technical Problem

By the way, the BLI fan as described above is typically provided outside an outer surface of the fuselage. In this case, rotor blades of the BLI fan rotate around a rotor shaft disposed outside the fuselage with respect to the outer surface of the fuselage. In the BLI fan having such a configuration, the boundary layer formed on the outer surface of the fuselage more affects the air flow inside a housing of the BLI fan in a region closer to the outer surface of the fuselage than to the rotor shaft compared to in a region farther from the outer surface of the fuselage than from the rotor shaft. For that reason, the flow speed of the air decreases on a side closer to the outer surface of the fuselage than to the rotor shaft. As a result, inside the housing of the BLI fan, there occurs a distribution of the inflow angles of the air flow with respect to the rotor blades in a radial direction and a circumferential direction of the housing. Further, in a region where the flow speed of the air is slow, since separation is likely to occur on the blade surfaces of the rotor blades, a stall is likely to occur in the vicinities of stator blade tip portions on a radial inner side of stator blades disposed downstream of the rotor blades. On the other hand, in order to avoid such a stall, when the operation of the BLI fan in a region where a stall is likely to occur is stopped, the operating range of the BLI fan is narrowed, so that a further improvement in the propulsion efficiency of the aircraft by the BLI fan becomes difficult, which is a problem.

The present disclosure has been made to solve the foregoing problem, and an object of the present disclosure is to provide an aircraft capable of expanding the operating range of a fan device and further improving the propulsion efficiency by suppressing the separation of an air flow inside a housing.

Solution to Problem

In order to solve the foregoing problem, according to the present disclosure, there is provided an aircraft including: a fuselage body; a tail wing; a main wing; and a fan device. The fuselage body extends in a front-rear direction. The tail wing is provided at a rear portion of the fuselage body. The main wing is provided in front of the tail wing in the front-rear direction on the fuselage body. The fan device is provided on an outer surface of the fuselage body. The fan device includes a rotor shaft, a rotor blade, a housing, a stator blade, and a stator blade fluid suction portion. The rotor shaft is disposed outside the outer surface of the fuselage body in a fuselage radial direction. The rotor shaft is provided to be rotatable around a central axis extending in the front-rear direction. The rotor blade is provided on an outer side of the rotor shaft in a rotor radial direction with the rotor shaft as a center. The housing is fixed to the fuselage body. The housing extends in the front-rear direction, and includes respective openings at a front and a rear in the front-rear direction. The housing is provided to cover the rotor shaft and the rotor blade. The stator blade extends inward from an inner peripheral surface of the housing in the rotor radial direction. The stator blade fluid suction portion suctions a fluid on a stator blade tip portion side of the stator blade on an inner side of the rotor radial direction.

According to the present disclosure, there is provided an aircraft including: a fuselage body; a tail wing; a main wing; and a fan device. The fuselage body extends in a front-rear direction. The tail wing is provided at a rear portion of the fuselage body. The main wing is provided in front of the tail wing in the front-rear direction on the fuselage body. The fan device is provided on an outer surface of the fuselage body. The fan device includes a rotor shaft, a rotor blade, a housing, a stator blade, and a rotor blade fluid suction portion. The rotor shaft is disposed outside the outer surface of the fuselage body in a fuselage radial direction. The rotor shaft is provided to be rotatable around a central axis extending in the front-rear direction. The rotor blade is provided on an outer side of the rotor shaft in a rotor radial direction with the rotor shaft as a center. The housing is fixed to the fuselage body. The housing extends in the front-rear direction, and includes respective openings at a front and a rear in the front-rear direction. The housing is provided to cover the rotor shaft and the rotor blade. The stator blade extends inward from an inner peripheral surface of the housing in the rotor radial direction. The rotor blade fluid suction portion suctions a fluid inside the housing on an outer side of the rotor blade in the rotor radial direction.

Advantageous Effects of Invention

According to the aircraft of the present disclosure, it is possible to expand the operating range of the fan device and improve the propulsion efficiency by suppressing the separation of an air flow inside the housing.

DESCRIPTION OF EMBODIMENTS

First Embodiment (Configuration of Aircraft)

Hereinafter, an aircraft according to an embodiment of the present disclosure will be described with reference to FIGS. 1 to 7.

Figure 1:
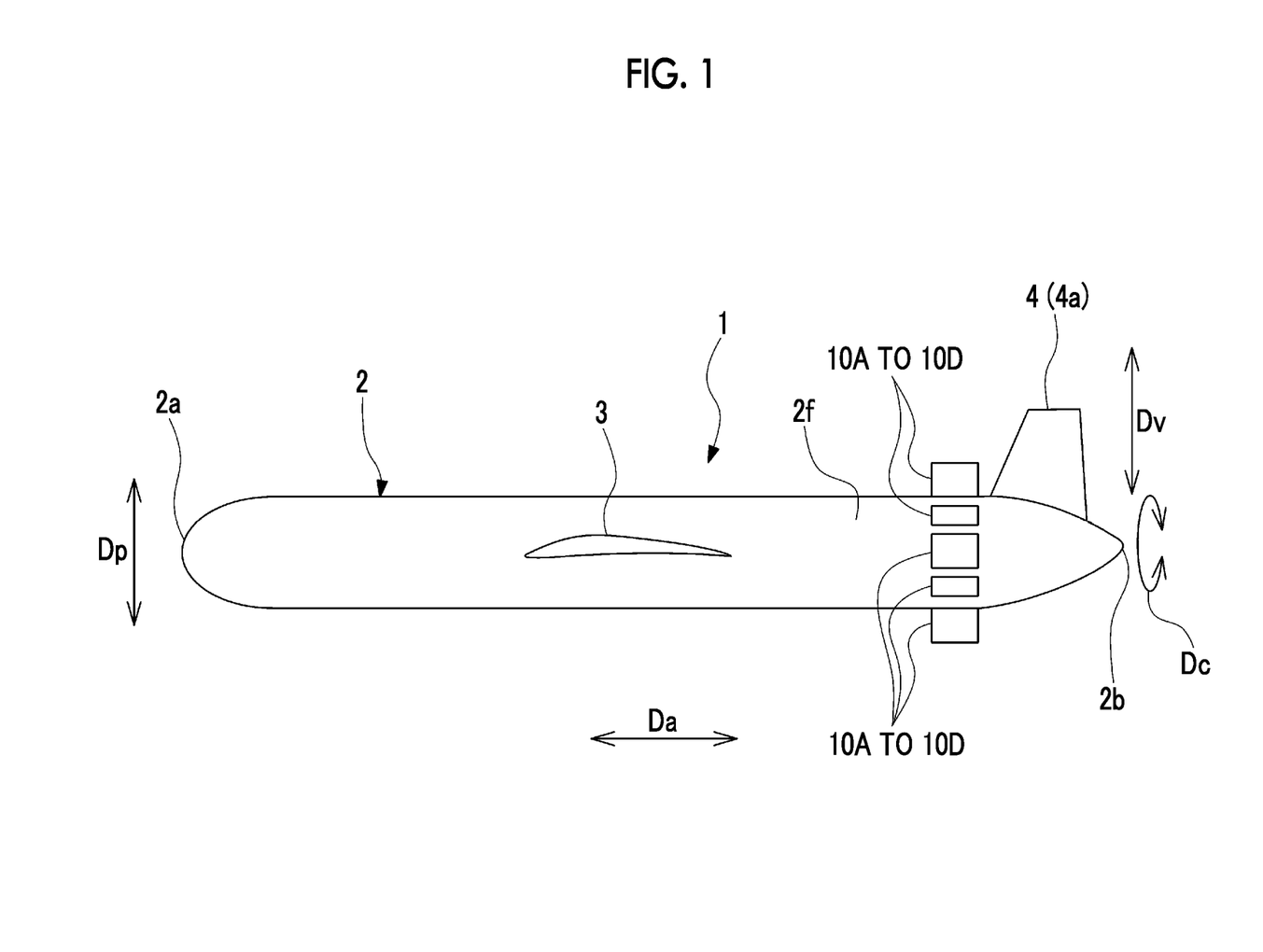
FIG. 1 is a side view of an aircraft according to an embodiment of the present disclosure.

As shown in FIG. 1, an aircraft 1 includes at least a fuselage body 2, a tail wing 4, a main wing 3, and a fan device 10A.

The fuselage body 2 extends in a front-rear direction Da in which a nose 2a and a tail (rear portion) 2b are connected to each other. The tail wing 4 is provided at the tail 2b of the fuselage body 2.

The tail wing 4 includes a vertical tail wing 4a and a pair of horizontal tail wings (not shown). The vertical tail wing 4a extends upward from the tail 2b of the fuselage body 2 in an up-down direction Dv. For example, the horizontal tail wings (not shown) extend from the tail 2b of the fuselage body 2 to both sides in a width direction orthogonal to the front-rear direction Da and the up-down direction Dv (direction orthogonal to the sheet of FIG. 1). For example, the horizontal tail wings (not shown) may extend from an upper end of the vertical tail wing 4a to both sides in the width direction.

The main wing 3 is provided in front of the tail wing 4 in the front-rear direction Da (on a side closer to the nose 2a) on the fuselage body 2. The main wing 3 is provided between the nose 2a and the tail 2b of the fuselage body 2. The main wing 3 extends from the fuselage body 2 to both sides in the width direction. In addition, the aircraft 1 includes a propulsion device (not shown) such as a motor or a jet engine.

(Configuration of Fan Device)

Figure 2:
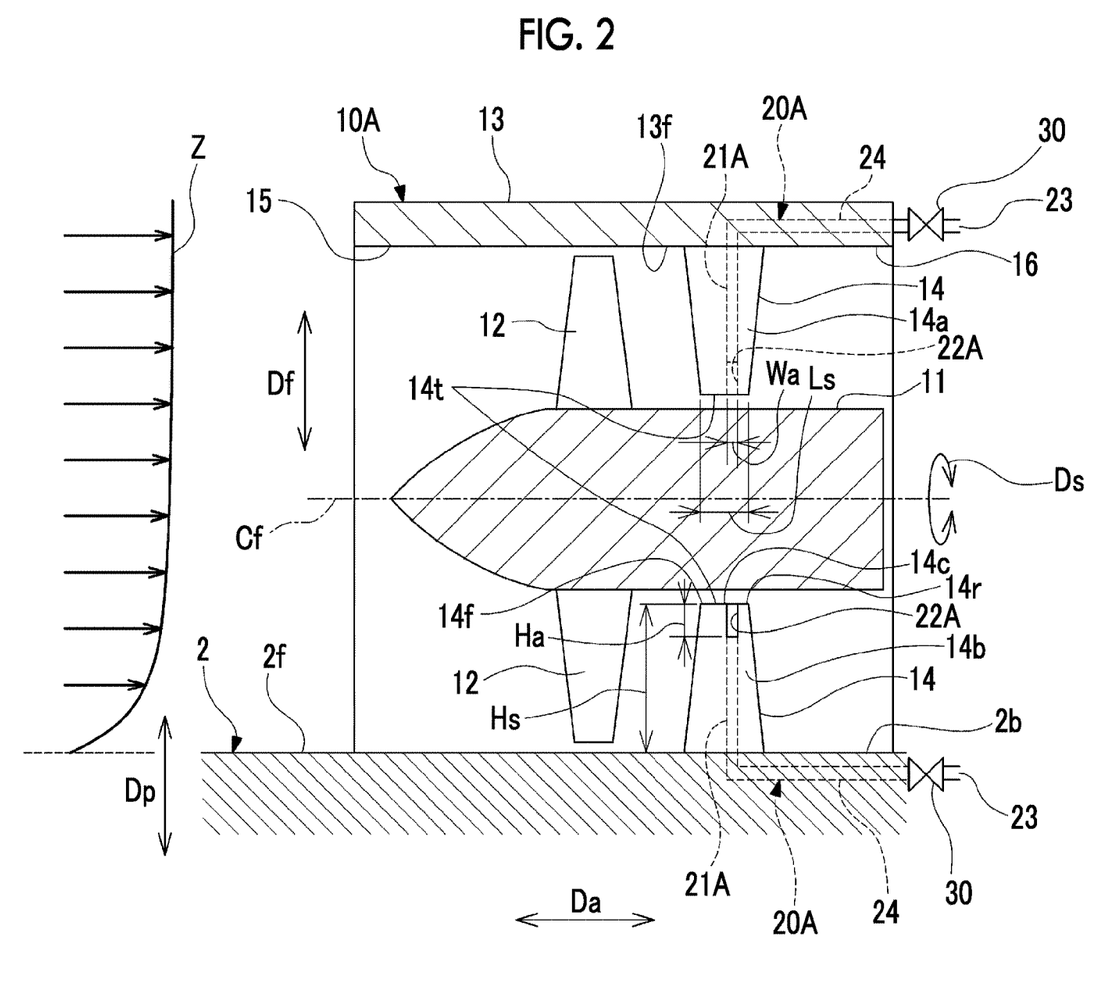
FIG. 2 is a cross-sectional view of a sensor device provided in an aircraft according to a first embodiment of the present disclosure.

The fan device 10A is provided outside the fuselage body 2 in a fuselage radial direction Dp. The fan device 10A is provided on an outer surface 2f of the tail 2b of the fuselage body 2. A plurality of the fan devices 10A are provided at intervals in a fuselage circumferential direction Dc along the outer surface 2f of the fuselage body 2. As shown in FIG. 2, each of the fan devices 10A includes a rotor shaft 11, rotor blades 12, a housing 13, stator blades 14, and fluid suction portions 20A.

The rotor shaft 11 is disposed outside the outer surface 2f of the fuselage body 2 (on the upper side in FIG. 2) in the fuselage radial direction Dp. The rotor shaft 11 is provided to be rotatable around a central axis Cf via bearings (not shown), the central axis Cf extending in the front-rear direction Da. The rotor shaft 11 is rotationally driven around the central axis Cf by a motor (not shown) or the like.

The rotor blades 12 are provided on an outer side of the rotor shaft 11 in a fan radial direction (rotor radial direction) Df with the rotor shaft 11 as the center. The rotor blades 12 are provided to extend outward from the rotor shaft 11 in the fan radial direction Df. A plurality of the rotor blades 12 are provided at intervals in a fan circumferential direction (rotor circumferential direction) Ds around the rotor shaft 11. The plurality of rotor blades 12 rotate around the central axis Cf integrally with the rotor shaft 11.

The housing 13 is fixed to the fuselage body 2. The housing 13 extends in the front-rear direction Da, and includes an opening 15 at the front in the front-rear direction Da and an opening 16 at the rear. The housing 13 is provided to cover the rotor shaft 11 and the rotor blades 12. Gas flows into the housing 13 from the opening 15 at the front in the front-rear direction Da. The gas that has flowed into the housing 13 is discharged to the outside of the fan devices 10A from the opening 16 at the rear.

The stator blades 14 extend inward from an inner peripheral surface 13f of the housing 13 in the fan radial direction Df. A plurality of the stator blades 14 are provided at intervals in the fan circumferential direction Ds. The plurality of stator blades 14 are disposed at intervals behind the plurality of rotor blades 12 in the front-rear direction Da. Each of the stator blades 14 has a pressure surface 14a on one side in the fan circumferential direction Ds, the pressure surface 14a receiving an air flow swirling around the central axis Cf via the plurality of rotor blades 12.

Each of the stator blades 14 has a suction surface 14b on the other side in the fan circumferential direction Ds, the suction surface 14b being opposite to the pressure surface 14a. In FIG. 2, the stator blades 14 are described as cantilever stator blades in which tips on an inner peripheral side of the stator blades 14 have a certain gap with respect to the rotor shaft 11; however, there is no problem even if a shroud structure in which the rotor shaft 11 is provided with recessed portions is applied.

(Configuration of Fluid Suction Portion)

The fluid suction portions 20A suction some of the gas (fluid) flowing in the housing 13 to reduce the influence of a boundary layer generated inside the housing 13. Each of the fluid suction portions 20A of the present embodiment includes a stator blade fluid suction portion 21A and an opening-closing valve 30.

The stator blade fluid suction portion 21A suctions the fluid on a stator blade tip portion 14t side of the stator blade 14 on an inner side of the fan radial direction Df. A plurality of the stator blade fluid suction portions 21A are provided at intervals in the fan circumferential direction Ds around the rotor shaft 11. Each of the stator blade fluid suction portions 21A includes a first opening portion 22A, a second opening portion 23, and a first flow path portion 24.

The first opening portion 22A is open on the stator blade tip portion 14t of the stator blade 14. In the present embodiment, the first opening portion 22A has a slit shape that is open on the suction surface 14b of the stator blade 14 at the stator blade tip portion 14t, the suction surface 14b becoming a low pressure side during operation of the fan device 10A. It is preferable that a height Ha of the first opening portion 22A in the fan radial direction Df is approximately 0.2 times a height Hs of the stator blade 14 in the fan radial direction Df. Accordingly, in the stator blade 14, the air can be suctioned from the vicinity of the stator blade tip portion 14t that is a starting point when a stall occurs in the air flow.

The position of the first opening portion 22A in the front-rear direction Da may be located behind (downstream side) an intermediate position 14c between a leading edge 14f and a trailing edge 14r of the stator blade 14 at the stator blade tip portion 14t in the front-rear direction Da. By setting the position of the first opening portion 22A in the front-rear direction Da to such a position, the boundary layer in the vicinity of a separation start point at the stator blade tip portion 14t can be efficiently suctioned. In addition, in order to maintain the blade surface shape of the suction surface 14b of the stator blade 14, a width Wa of the first opening portion 22A in the front-rear direction Da may be set to be equal to or less than 0.1 times a length Ls of the stator blade tip portion 14t in the front-rear direction Da.

The second opening portion 23 is open behind the first opening portion 22A in the front-rear direction Da. The second opening portion 23 is further open behind the fan device 10A. The second opening portion 23 can be provided, for example, at a rear portion of the housing 13 or the tail 2b of the fuselage body 2. The second opening portion 23 of the present embodiment is open toward the rear in the front-rear direction Da. The opening position of the second opening portion 23 is not limited to the rear side of the fan device 10A, and may be located, for example, on an outer peripheral side of the housing 13.

The first flow path portion 24 communicates the first opening portion 22A and the second opening portion 23. The first flow path portion 24 is provided in the housing 13 or the fuselage body 2. The rear side of the second opening portions 23 becomes a negative pressure region during flight of the aircraft 1. On the other hand, the total pressure increases on an upstream side of the stator blades 14 by a pressure ratio of the rotor blades due to the compression effect of the rotor blades 12, and static pressure on the blade surfaces of the stator blades 14 also becomes higher than pressure behind the fan. Accordingly, the fluid (air) forming the boundary layer flowing in the housing 13 is suctioned through the first opening portions 22A from regions in the vicinities of the stator blade tip portions 14t including the gaps between the stator blade tip portions 14t and the rotor shaft 11. The fluid suctioned through the first opening portions 22A is discharged rearward from the second opening portions 23 via the first flow path portions 24. A flow rate of the suctioned fluid is assumed to be approximately 1% of the main flow, and the width Wa and the length Ls need to be determined to satisfy the assumed suctioned flow rate.

The opening-closing valve 30 intermittently interrupts the suction of the fluid in each of the stator blade fluid suction portions 21A. The opening-closing valve 30 is provided between the first opening portion 22A and the second opening portion 23 in the first flow path portion 24. In the embodiment of the present disclosure, the opening-closing valves 30 can be opened and closed, for example, by an operator of the fan device 10A such as a pilot or an engineer of the aircraft 1. The opening-closing valves 30 open and close, for example, based on the rotation speed of the fan device 10A. Specifically, for example, when the rotation speed of the fan device 10A is equal to or higher than a rotation speed N that is a threshold value for the rotation speed set in advance, the opening-closing valve 30 is changed from a closed state to an open state. On the other hand, when the rotation speed of the fan device 10A is not equal to or higher than the rotation speed N, the opening-closing valve 30 is set to a closed state. Here, as an example of the rotation speed N, a rotation speed at which the ratio of a surge flow rate G2 to a design flow rate G1 in the fan device 10A is larger than a threshold value for the ratio set in advance can be provided. In addition, the surge flow rate G2 is a flow rate of the fluid flowing through the fan device 10A when a stall occurs at any of the rotor blades 12 and the stator blades 14 of the fan device 10A to form a large backflow region and to cause strong fluctuation in flow rate or fluctuation in pressure before and after the housing 13.

In the fan device 10A, an air flow is generated from the opening 15 at the front toward the opening 16 at the rear inside the housing 13 by rotating the rotor shaft 11 and the rotor blades 12 around the central axis Cf. Accordingly, a boundary layer formed on the outer surface 2f of the fuselage body 2 during flight is suctioned into the housing 13 from the opening 15 at the front of the housing 13. Accordingly, the influence of the boundary layer is suppressed. In addition, the fan device 10A obtains thrust by blowing the generated air flow rearward from the opening 16 at the rear of the housing 13 in a propulsion direction of the fuselage.

The fan device 10A is provided on the outer surface 2f of the fuselage body 2. The stator blade fluid suction portions 21A suction the fluid in the vicinities of the stator blade tip portions 14t of the stator blades 14. As indicated by reference sign Z in FIG. 2, due to the influence of the boundary layer on an opening 15 side at the front of the fan device 10A, the closer the air flow is to the outer surface 2f of the fuselage body 2, the slower the flow speed of air is. Inside the housing 13, particularly in a region on an outer surface 2f side of the fuselage body 2 with respect to the rotor shaft 11, the air in the vicinities of the stator blade tip portions 14t is suctioned, so that a decrease in the flow speed of air in the vicinities of the stator blade tip portions 14t due to the influence of the boundary layer is suppressed.

(Actions and Effects)

In the aircraft 1 of the embodiment, the stator blade fluid suction portions 21A suction the fluid on the stator blade tip portion 14t side of the stator blades 14. Accordingly, the following situation is suppressed: inside the housing 13, particularly in the region on the outer surface 2f side of the fuselage body 2 with respect to the rotor shaft 11, due to the influence of the boundary layer, the flow speed of the air flow in the vicinities of the stator blade tip portions 14t decreases, the inflow angle with respect to the stator blades 14 increases, and the flow on the blade surfaces is separated. Therefore, a stall in the vicinities of the stator blades 14 is suppressed, and the separation of the air flow inside the housing 13 is suppressed. As described above, the operating range of the fan device 10A can be expanded, and the propulsion efficiency of the aircraft 1 can be improved.

In the embodiment, the plurality of fan devices 10A are provided at intervals in the fuselage circumferential direction Dc. Accordingly, on the outer surface 2f of the fuselage body 2, in the entire fuselage circumferential direction Dc, the influence of the boundary layer is suppressed, and a stall in the vicinity of the stator blade 14 is suppressed.

In the embodiment, each of the stator blade fluid suction portions 21A includes the first flow path portion 24 that communicates the first opening portion 22A and the second opening portion 23 that is open behind the first opening portion 22A.

Accordingly, in each of the stator blade fluid suction portions 21A, the fluid suctioned from the first opening portion 22A can be discharged from the second opening portion 23 through the first flow path portion 24.

In the embodiment, each of the stator blade fluid suction portions 21A includes the opening-closing valve 30.

Accordingly, the suction of the fluid in the stator blade fluid suction portion 21A can be intermittently interrupted according to various conditions during flight. Therefore, the effect of suppressing a stall in the vicinities of the stator blades 14 and the effect of exerting thrust using the fan device 10A can be obtained in a well-balanced manner.

Second Embodiment

Next, a second embodiment of the aircraft according to the present disclosure will be described. In the second embodiment to be described below, since only a configuration of a fluid suction portion of a fan device is different from that of the first embodiment, a description will be given assuming that the same portions as those of the first embodiment are denoted by the same reference signs, and duplicate descriptions will be omitted.
(Configuration of Fan Device)

Figure 3:
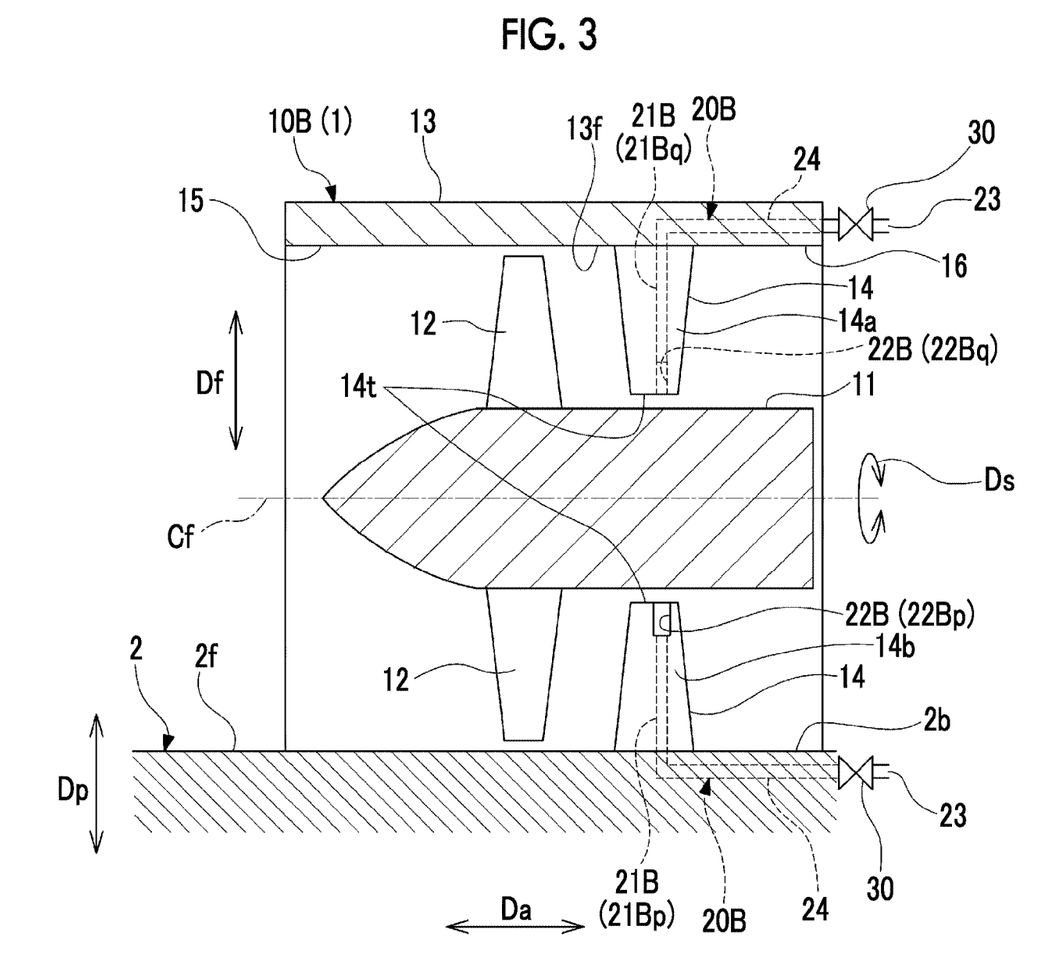
FIG. 3 is a cross-sectional view of a sensor device provided in an aircraft according to a second embodiment of the present disclosure.

As shown in FIG. 3, in a fan device 10B of the aircraft 1 according to the second embodiment of the present disclosure, a fluid suction portion 20B includes a stator blade fluid suction portion 21B. The stator blade fluid suction portion 21B suctions the fluid on the stator blade tip portion 14t side of the stator blade 14 on the inner side of the fan radial direction Df. A plurality of the stator blade fluid suction portions 21B are provided at intervals in the fan circumferential direction Ds around the rotor shaft 11. Each of the stator blade fluid suction portions 21B includes a first opening portion 22B, the second opening portion 23, the first flow path portion 24, and the opening-closing valve 30.

The first opening portion 22B is open on the stator blade tip portion 14t of each of the stator blades 14. The first opening portion 22B of the present embodiment is formed in a slit shape that is open on the suction surface 14b of the stator blade 14 at the stator blade tip portion 14t, the suction surface 14b becoming a low pressure side during operation of the fan device 10B.

In the present embodiment, an opening area of a first opening portion 22Bp of a stator blade fluid suction portion 21Bp located on a side closer to the fuselage body 2 with respect to the rotor shaft 11 (inner side of the fuselage radial direction Dp) is larger than an opening area of a first opening portion 22Bq of a stator blade fluid suction portion 21Bq located on a side farther from the fuselage body 2 with respect to the rotor shaft 11 (outer side of the fuselage radial direction Dp). For example, the opening width in the front-rear direction Da may be made different between the first opening portion 22Bp on the inner side of the fuselage radial direction Dp and the first opening portion 22Bq on the outer side of the fuselage radial direction Dp, or the opening height in the fan radial direction Df may be made different therebetween.
(Actions and Effects)

In the second embodiment, a larger amount of the fluid can be suctioned from the first opening portion 22Bp of the stator blade fluid suction portion 21Bp disposed on a fuselage body 2 side with respect to the rotor shaft 11. Inside the housing 13 of the fan device 10B, since the fuselage body 2 side with respect to the rotor shaft 11 is more strongly affected by the boundary layer, by suctioning a larger amount of the fluid on the fuselage body 2 side with respect to the rotor shaft 11 in such a manner, the occurrence of a stall in the vicinity of the stator blade tip portion 14t on the fuselage body 2 side due to the influence of the boundary layer can be effectively suppressed. On the other hand, by suppressing the suction amount of the fluid through the first opening portion 22Bq of the stator blade fluid suction portion 21Bq on the side farther from the fuselage body 2 with respect to the rotor shaft 11, a decrease in thrust can be suppressed.

In the embodiment, the opening area of the first opening portion 22B is made different between the fuselage body 2 side with respect to the rotor shaft 11 and a side separated from the fuselage body 2; however, the present disclosure is not limited thereto. For example, the cross-sectional area of the first flow path portion 24 may be made different between the side closer to the fuselage body 2 and the side farther from the fuselage body 2. In addition, for example, the opening degree of the opening-closing valve 30 may be made different between the side closer to the fuselage body 2 and the side farther from the fuselage body 2.

Third Embodiment

Next, a third embodiment of the aircraft according to the present disclosure will be described. In the third embodiment to be described below, since only a configuration of a fluid suction portion of a fan device is different from those of the first and second embodiments, a description will be given assuming that the same portions as those of the first and second embodiments are denoted by the same reference signs, and duplicate descriptions will be omitted.

Figure 4:
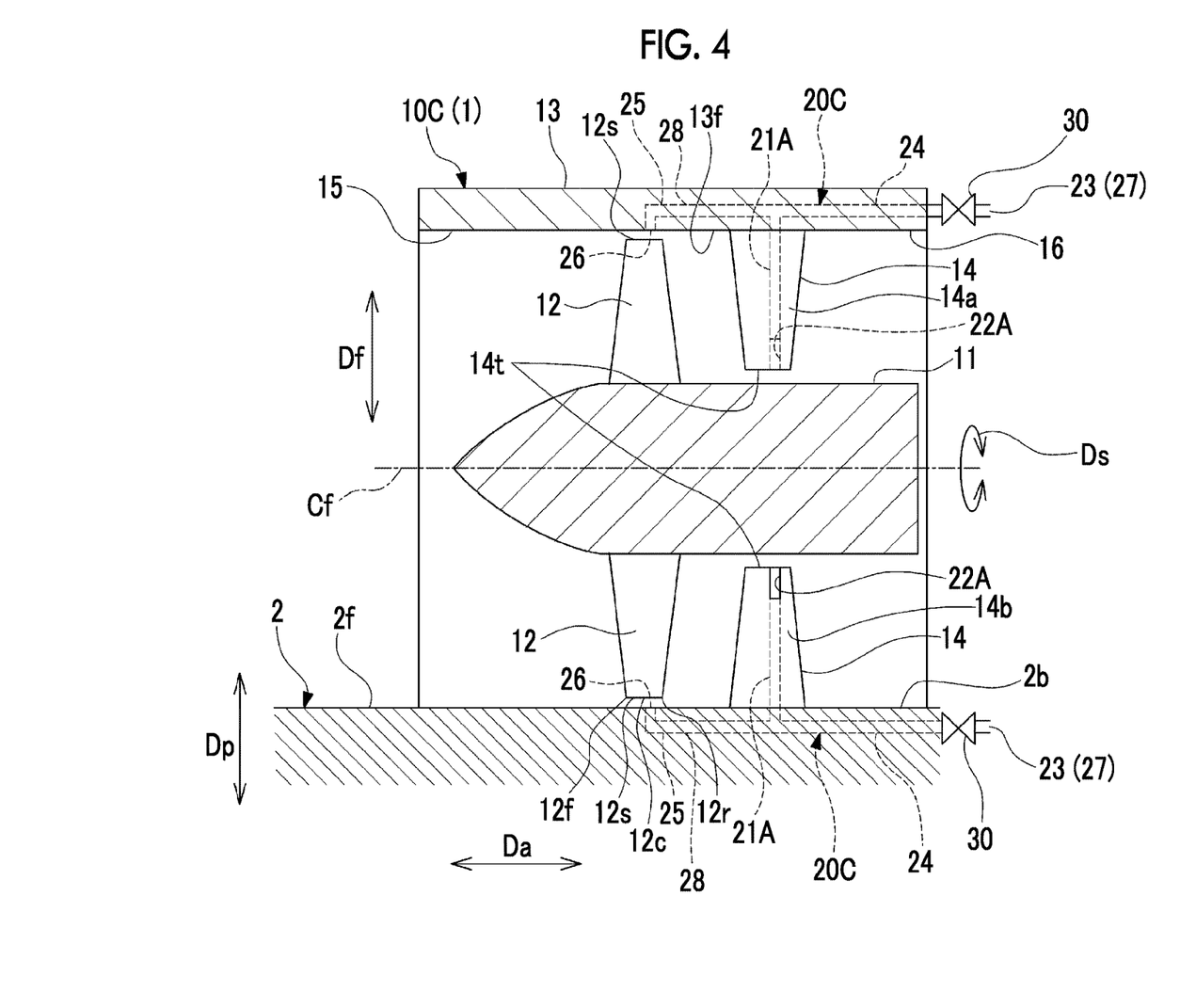
FIG. 4 is a cross-sectional view of a sensor device provided in an aircraft according to a third embodiment of the present disclosure.

As shown in FIG. 4, in a fan device 10C of the aircraft 1 according to the third embodiment of the present disclosure, a fluid suction portion 20C includes the stator blade fluid suction portion 21A, a rotor blade fluid suction portion 25, and the opening-closing valve 30.

The rotor blade fluid suction portion 25 suctions the fluid inside the housing 13 on the outer side of the rotor blade 12 in the fan radial direction Df. In the present embodiment, it is assumed that a plurality of the rotor blade fluid suction portions 25 are provided at intervals in the fan circumferential direction Ds around the rotor shaft 11; however, the plurality of rotor blade fluid suction portions 25 may be formed in a slit shape and communicate with each other in the fan circumferential direction Ds. The rotor blade fluid suction portions 25 are provided in the housing 13 or the fuselage body 2 located outside the rotor blades 12 in the fan radial direction Df. Each of the rotor blade fluid suction portions 25 includes a third opening portion 26, a fourth opening portion 27, and a second flow path portion 28.

The third opening portion 26 is open to face a rotor blade tip portion 12s of the rotor blade 12 on the outer side of the fan radial direction Df. The position of the third opening portion 26 in the front-rear direction Da may be located behind (downstream side) an intermediate position 12c between a leading edge 12f and a trailing edge 12r of the rotor blade 12 at the rotor blade tip portion 12s in the front-rear direction Da. The fourth opening portion 27 is open behind the third opening portion 26 in the front-rear direction Da. In the embodiment of the present disclosure, the fourth opening portion 27 also serves as the second opening portion 23, and is open toward the rear in the front-rear direction Da at the rear portion of the housing 13 or the tail 2b of the fuselage body 2. The rear side of the fourth opening portion 27 becomes a negative pressure region during flight of the aircraft 1.

The second flow path portion 28 communicates the third opening portion 26 and the fourth opening portion 27. The second flow path portion 28 is merged and connected to the first flow path portion 24. Accordingly, the fluid (air) flowing in the housing 13 is suctioned through the third opening portion 26 from a region in the vicinity of the rotor blade tip portion 12s including a gap between the rotor blade tip portion 12s and the inner peripheral surface of the housing 13 or the outer surface 2f of the fuselage body 2. The fluid suctioned from the third opening portion 26 is discharged rearward from the fourth opening portion 27 (second opening portion 23) via the second flow path portion 28 and the first flow path portion 24.

The opening-closing valve 30 intermittently interrupts the suction of the fluid in each of the stator blade fluid suction portions 21A and the rotor blade fluid suction portions 25.

In the fan device 10C, similarly to the first embodiment, the stator blade fluid suction portion 21A suctions the fluid in the vicinity of the stator blade tip portion 14t of the stator blade 14. In addition, the rotor blade fluid suction portion 25 suctions the fluid inside the housing 13 on the outer side of the rotor blade 12 in the fan radial direction Df. Accordingly, the following situation is suppressed: inside the housing 13 of the fan device 10C, due to the influence of the boundary layer, the flow speed of the air in the vicinities of the stator blade tip portion 14t and the rotor blade tip portion 12s decreases, the inflow angle with respect to the blades increases, and the flow on the blade surfaces is separated.
(Actions and Effects)

In the aircraft 1 of the embodiment, the stator blade fluid suction portions 21A suction the fluid on the stator blade tip portion 14t side of the stator blades 14. In addition, the rotor blade fluid suction portions 25 suction the fluid on a rotor blade tip portion 12s side. Accordingly, inside the housing 13, particularly in a region on the outer surface 2f side of the fuselage body 2 with respect to the rotor shaft 11, a decrease in the flow speed of the air flow in the vicinities of the rotor blade tip portions 12s due to the influence of the boundary layer is suppressed. Therefore, a stall not only in the vicinities of the stator blades 14 but also in the vicinities of the rotor blades 12 is suppressed, and the separation of the air flow inside the housing 13 is suppressed. As described above, the operating range of the fan device 10C can be expanded, and the propulsion efficiency of the aircraft 1 can be improved.

In the embodiment, each of the rotor blade fluid suction portions 25 includes the second flow path portion 28 that communicates the third opening portion 26 and the fourth opening portion 27.

Accordingly, in each of the rotor blade fluid suction portions 25, the fluid suctioned from the third opening portion 26 can be discharged from the fourth opening portion 27 through the second flow path portion 28.

In the embodiment, the configuration is such that the second flow path portion 28 is merged with the first flow path portion 24 and the opening-closing valve 30 is shared between the stator blade fluid suction portion 21A and the rotor blade fluid suction portion 25; however, the present disclosure is not limited to the configuration. The second flow path portion 28 and the fourth opening portion 27 may be provided independently of the first flow path portion 24. In addition, the opening-closing valve 30 may also be provided for each of the first flow path portion 24 and the second flow path portion 28, and the suction amount of the fluid may be separately adjusted for the stator blade fluid suction portion 21A and the rotor blade fluid suction portion 25.

Modification Example of Third Embodiment

In the third embodiment, the stator blade fluid suction portions 21A and the rotor blade fluid suction portions 25 are provided; however, the present disclosure is not limited thereto. For example, the configuration may be such that the stator blade fluid suction portions 21A are not provided and only the rotor blade fluid suction portions 25 are provided.

Fourth Embodiment

Next, a fourth embodiment of the aircraft according to the present disclosure will be described. Since the fourth embodiment to be described below differs from the first embodiment only in that a configuration in which a control device for a fan device is provided is adopted, a description will be given assuming that the same portions as those of the first embodiment are denoted by the same reference signs, and duplicate descriptions will be omitted. In addition, a control unit to be described in the fourth embodiment of the present disclosure can be combined with the configurations shown in the second and third embodiments.

Figure 5:
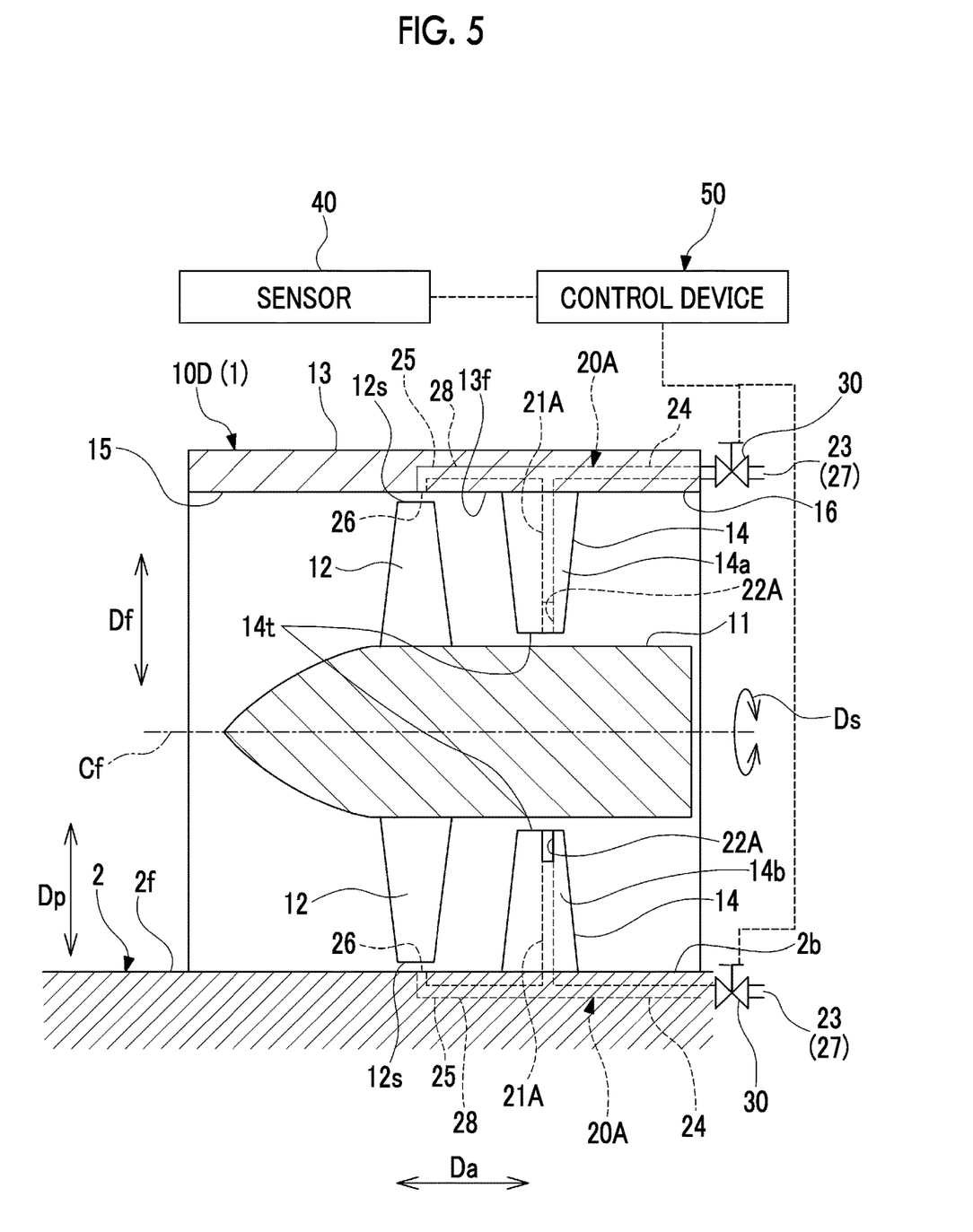
FIG. 5 is a cross-sectional view of a sensor device provided in an aircraft according to a fourth embodiment of the present disclosure.

As shown in FIG. 5, the aircraft 1 according to the fourth embodiment of the present disclosure includes a fan device 10D and a control device 50.

The control device 50 controls opening and closing of the opening-closing valve 30 of the fan device 10D. The control device 50 controls the opening and closing of the opening-closing valve 30, for example, based on various data detected by a sensor 40. Examples of the sensor 40 include a rotation speed sensor that detects a rotation speed of the fan device 10D, a temperature sensor that detects a temperature (inlet temperature) of the air flowing into the housing 13 of the fan device 10D, and the like. In addition, for example, when a propulsion device such as a jet engine is provided in addition to the fan device 10D, the sensor 40 may detect a rotation speed of the propulsion device.
(Functional Block Diagram)

Figure 6:
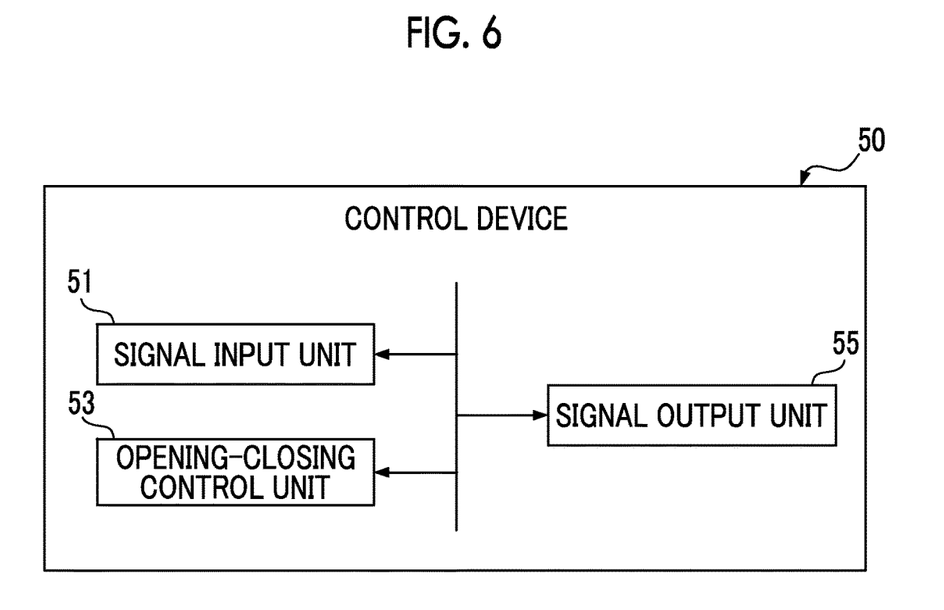
FIG. 6 is a functional block diagram of a control device provided in the aircraft according to the fourth embodiment of the present disclosure.

As shown in FIG. 6, for example, the control device 50 realizes each functional configuration of a signal input unit 51, an opening-closing control unit 53, and a signal output unit 55 by executing a program stored in a storage device (not shown) in advance. The control device 50 may realize the functional configuration through hardware.

The signal input unit 51 receives detection signals from the sensor 40. The opening-closing control unit 53 determines whether to open or close the opening-closing valve 30, based on the detection signals from the sensor 40 received by the signal input unit 51. The signal output unit 55 outputs a signal for opening and closing the opening-closing valve 30 to the opening-closing valve 30 based on the determination result by the opening-closing control unit 53.
(Processing Procedure)

Figure 7:
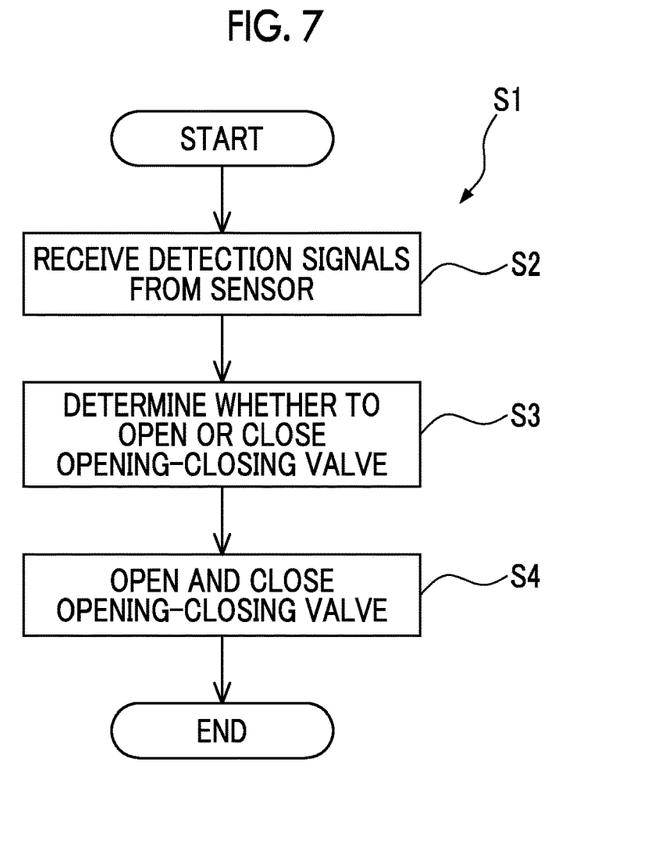
FIG. 7 is a flowchart showing a procedure of a control method for a fan device according to the fourth embodiment of the present disclosure.

As shown in FIG. 7, a control method S1 for the fan device according to the embodiment of the present disclosure includes a step S2 of receiving detection signals from the sensor 40; a step S3 of determining whether to open or close the opening-closing valve 30; and a step S4 of opening and closing the opening-closing valve 30.

In step S2 of receiving detection signals from the sensor 40, the signal input unit 51 receives detection signals such as a rotation speed of the fan device 10D and an inlet temperature of the housing 13 detected by the sensor 40 at time intervals set in advance.

In step S3 of determining whether to open or close the opening-closing valve 30, it is determined whether to open or close the opening-closing valve 30, namely, whether to set the opening-closing valve 30 to an open state or a closed state, based on conditions such as the rotation speed of the fan device 10D and the inlet temperature of the housing 13 received as the detection signals in step S2. It is determined whether to open or close the opening-closing valve 30, for example, based on the rotation speed of the fan device 10D. Specifically, for example, when the rotation speed of the fan device 10D is equal to or higher than the rotation speed N, the opening-closing valve 30 is set to an open state. On the other hand, when the rotation speed of the fan device 10D is not equal to or higher than the rotation speed N, the opening-closing valve 30 is set to a closed state. Here, similarly to the first embodiment, the rotation speed N is a threshold value for the rotation speed at which the ratio of the surge flow rate G2 to the design flow rate G1 in the fan device 10D is larger than a threshold value set in advance. In this case, the rotation speed N may be corrected based on the inlet temperature of the housing 13 of the fan device 10D.

In step S4 of opening and closing the opening-closing valve 30, the opening and closing of the opening-closing valve 30 is controlled based on the determination result in step S3. Namely, when the opening-closing valve 30 is determined to be set to an open state in step S3, the signal output unit 55 outputs a control signal for opening the opening-closing valve 30 to the opening-closing valve 30. When the opening-closing valve 30 is determined to be set to a closed state in step S3, the signal output unit 55 outputs a control signal for closing the opening-closing valve 30 to the opening-closing valve 30.

(Actions and Effects)

In the aircraft 1 of the embodiment, the control device 50 causes the opening-closing valve 30 to be automatically opened and closed according to operating conditions of the fan device 10D and the like. Accordingly, the opening-closing valve 30 can be opened and closed at an appropriate timing according to a state of the aircraft 1 during flight, a state of the fan device 10D, and the like. Therefore, the separation of the air flow in the fan device 10D can be effectively suppressed, the operating range of the fan device 10D can be expanded, and the propulsion efficiency of the aircraft 1 can be improved.

Other Embodiments

The embodiments of the present disclosure have been described in detail above with reference to the drawings; however, the specific configurations are not limited to the embodiments, and include design changes or the like that are without departing from the concept of the present disclosure.

The order of the foregoing procedures can be changed as appropriate.

<Additional Notes>

For example, the aircraft 1 described in each embodiment is understood as follows.

(1) According to a first aspect, there is provided an aircraft 1 including: a fuselage body 2 extending in a front-rear direction Da; a tail wing 4 provided at a tail 2b of the fuselage body 2 in the front-rear direction Da; a main wing 3 provided in front of the tail wing 4 in the front-rear direction Da on the fuselage body 2; and a fan device 10A, 10B, 10C, or 10D provided on an outer surface 2f of the fuselage body 2. The fan device 10A, 10B, 10C, or 10D includes a rotor shaft 11 disposed outside the outer surface 2f of the fuselage body 2 in a fuselage radial direction Dp and provided to be rotatable around a central axis Cf extending in the front-rear direction Da, a rotor blade 12 provided on an outer side of the rotor shaft 11 in a fan radial direction Df with the rotor shaft 11 as a center, a housing 13 fixed to the fuselage body 2, extending in the front-rear direction Da, including respective openings 15 and 16 at a front and a rear in the front-rear direction Da, and provided to cover the rotor shaft 11 and the rotor blade 12, a stator blade 14 extending inward from an inner peripheral surface 13f of the housing 13 in the fan radial direction Df, and a stator blade fluid suction portion 21A or 21B that suctions a fluid on a stator blade tip portion 14t side of the stator blade 14 on an inner side of the fan radial direction Df.

The fan device 10A, 10B, 10C, or 10D of the aircraft 1 generates an air flow from the front toward the rear inside the housing 13 by rotating the rotor shaft 11 and the rotor blade 12 around the central axis Cf. Accordingly, a boundary layer formed on the outer surface 2f of the fuselage body 2 during flight is suctioned into the housing 13 from the opening 15 at the front of the housing 13, so that an influence of the boundary layer can be suppressed. In addition, the fan device 10A, 10B, 10C, or 10D can obtain thrust by blowing the generated air flow rearward from the opening 16 at the rear of the housing 13 in a propulsion direction of the fuselage.

Further, the fan device 10A, 10B, 10C, or 10D is provided on the outer surface 2f of the fuselage body 2, and the stator blade fluid suction portion 21A or 21B suctions the fluid on the stator blade tip portion 14t side of the stator blade 14. Accordingly, the following situation is suppressed: inside the housing 13, particularly in a region on the side closer to the outer surface 2f of the fuselage body 2 with respect to the rotor shaft 11, due to the influence of the boundary layer, the flow speed of the air flow in the vicinity of the stator blade tip portion 14t decreases, the inflow angle with respect to the stator blade 14 increases, and the flow on the blade surface is separated. As described above, the operating range of the fan device 10A, 10B, 10C, or 10D can be expanded, and the propulsion efficiency of the aircraft 1 can be improved.

(2) According to the aircraft 1 of a second aspect, in the aircraft 1 described in (1), a plurality of the fan devices 10A, 10B, 10C, or 10D are provided at intervals in a fuselage circumferential direction Dc along the outer surface 2f of the fuselage body 2 on an outer side of the fuselage body 2 in the fuselage radial direction Dp.

Accordingly, on the outer surface 2f of the fuselage body 2, in the entire fuselage circumferential direction Dc, the influence of the boundary layer is suppressed, and a stall in the vicinity of the stator blade 14 is suppressed.

(3) According to the aircraft 1 of a third aspect, in the aircraft 1 described in (1) or (2), a plurality of the stator blade fluid suction portions 21A or 21B are provided at intervals in a fan circumferential direction Ds around the rotor shaft 11.

Accordingly, in the entire fan circumferential direction Ds inside the housing 13, the influence of the boundary layer can be suppressed, and a stall in the vicinity of the stator blade 14 can be effectively suppressed.

(4) According to the aircraft 1 of a fourth aspect, in the aircraft 1 described in (3), each of the stator blade fluid suction portions 21 includes a first flow path portion 24 that communicates a first opening portion 22A or 22B that is open on a stator blade tip portion 14t and a second opening portion 23 that is open behind the first opening portion 22A or 22B in the front-rear direction Da.

Accordingly, in each of the stator blade fluid suction portions 21A or 21B, the fluid suctioned from the first opening portion 22A or 22B can be discharged from the second opening portion 23 through the first flow path portion 24.

(5) According to the aircraft 1 of a fifth aspect, in the aircraft 1 described in (4), an opening area of the first opening portion 22B of the stator blade fluid suction portion 21B disposed on a side closer to the fuselage body 2 with respect to the rotor shaft 11 is larger than an opening area of the first opening portion 22B of the stator blade fluid suction portion 21B disposed on a side farther from the fuselage body 2 with respect to the rotor shaft 11.

Accordingly, a larger amount of the fluid can be suctioned from the first opening portion 22B of the stator blade fluid suction portion 21B disposed on the side closer to the fuselage body 2 with respect to the rotor shaft 11. Inside the housing 13 of the fan device 10B, the side closer to the fuselage body 2 with respect to the rotor shaft 11 is more strongly affected by the boundary layer. Accordingly, by suctioning a larger amount of the fluid on the side closer to the fuselage body 2 with respect to the rotor shaft 11, the occurrence of a stall in the vicinity of the stator blade tip portion 14t on the side closer to the fuselage body 2 due to the influence of the boundary layer can be suppressed. By suppressing the suction amount of the fluid on the side farther from the fuselage body 2 with respect to the rotor shaft 11, a decrease in thrust can be suppressed.

(6) In the aircraft 1 described in any one of (1) to (5), the aircraft 1 according to a sixth aspect further includes: an opening-closing valve 30 that intermittently interrupts the suction of the fluid in the stator blade fluid suction portion 21A or 21B.

Accordingly, the suction of the fluid in the stator blade fluid suction portion 21A or 21B can be intermittently interrupted according to various conditions during flight. Therefore, the effect of suppressing a stall in the vicinity of the stator blade 14 and the effect of exerting thrust using the fan device 10A, 10B, 10C, or 10D can be obtained in a well-balanced manner.

(7) In the aircraft 1 described in any one of (1) to (6), the aircraft 1 according to a seventh aspect further includes: a rotor blade fluid suction portion 25 that suctions the fluid inside the housing 13 on an outer side of the rotor blade 12 in the fan radial direction Df.

Accordingly, the rotor blade fluid suction portion 25 suctions the fluid on a rotor blade tip portion 12s side. Accordingly, the following situation is suppressed: inside the housing 13, particularly in a region on an outer surface 2f side of the fuselage body 2 with respect to the rotor shaft 11, due to the influence of the boundary layer, the flow speed of the air flow in the vicinity of the rotor blade tip portion 12s decreases, the inflow angle with respect to the stator blade 14 increases, and the flow on the blade surface is separated. Therefore, a stall not only in the vicinities of the stator blades 14 but also in the vicinities of the rotor blades 12 is suppressed, and the separation of the air flow inside the housing 13 is suppressed. As described above, the operating range of the fan device 10C can be expanded, and the propulsion efficiency of the aircraft 1 can be improved.

(8) According to the aircraft 1 of an eighth aspect, in the aircraft 1 described in (7), each of the rotor blade fluid suction portions 25 includes a second flow path portion 28 that communicates a third opening portion 26 that is open to face a rotor blade tip portion 12s in the fan radial direction Df and a fourth opening portion 27 that is open behind the third opening portion 26 in the front-rear direction Da.

Accordingly, in each of the rotor blade fluid suction portions 25, the fluid suctioned from the third opening portion 26 can be discharged from the fourth opening portion 27 through the second flow path portion 28.

(9) According to a ninth aspect, there is provided an aircraft 1 including: a fuselage body 2 extending in a front-rear direction Da; a tail wing 4 provided at a tail 2b of the fuselage body 2 in the front-rear direction Da; a main wing 3 provided in front of the tail wing 4 in the front-rear direction Da on the fuselage body 2; and a fan device 10C provided on an outer surface 2f of the fuselage body 2. The fan device 10C includes a rotor shaft 11 disposed outside the outer surface 2f of the fuselage body 2 in a fuselage radial direction Dp and provided to be rotatable around a central axis Cf extending in the front-rear direction Da, a rotor blade 12 provided on an outer side of the rotor shaft 11 in a fan radial direction Df with the rotor shaft 11 as a center, a housing 13 fixed to the fuselage body 2, extending in the front-rear direction Da, including respective openings 15 and 16 at a front and a rear in the front-rear direction Da, and provided to cover the rotor shaft 11 and the rotor blade 12, a stator blade 14 extending inward from an inner peripheral surface 13f of the housing 13 in the fan radial direction Df, and a rotor blade fluid suction portion 25 that suctions a fluid inside the housing 13 on an outer side of the rotor blade 12 in the fan radial direction Df.

The fan device 10C of the aircraft 1 is provided on the outer surface 2f of the fuselage body 2. The rotor blade fluid suction portion 25 suctions the fluid on a rotor blade tip portion 12s side. Accordingly, the following situation is suppressed: inside the housing 13, particularly in a region on a side closer to the outer surface 2f of the fuselage body 2 with respect to the rotor shaft 11, due to the influence of the boundary layer, the flow speed of an air flow in the vicinity of the rotor blade tip portion 12s decreases, the inflow angle with respect to the rotor blade 12 increases, and the flow on the blade surface is separated. Therefore, a stall in the vicinity of the rotor blade 12 is suppressed, and the separation of the air flow inside the housing 13 is suppressed. As described above, the operating range of the fan device 10C can be expanded, and the propulsion efficiency of the aircraft 1 can be improved.

INDUSTRIAL APPLICABILITY

According to the foregoing aspects, it is possible to expand the operating range of the fan device and improve the propulsion efficiency by suppressing the separation of the air flow inside the housing.

REFERENCE SIGNS LIST 1 aircraft
2 fuselage body
2a nose
2b tail
2f outer surface
3 main wing
4 tail wing
4a vertical tail wing
10A to 10D fan device
11 rotor shaft
12 rotor blade
12c intermediate position
12f leading edge
12r trailing edge
12s rotor blade tip portion
13 housing
13f inner peripheral surface
14 stator blade
14a pressure surface
14b suction surface
14c intermediate position
14f leading edge
14r trailing edge
14t stator blade tip portion 15, 16 opening
20A to 20C fluid suction portion
21A, 21B, 21Bp, 21Bq stator blade fluid suction portion
22A, 22B, 22Bp, 22Bq first opening portion
23 second opening portion
24 first flow path portion
25 rotor blade fluid suction portion
26 third opening portion
27 fourth opening portion
28 second flow path portion
30 opening-closing valve
40 sensor
50 control device
51 signal input unit
53 opening-closing control unit
55 signal output unit
Cf central axis

The invention claimed is:

1. An aircraft comprising:
    a fuselage body extending in a front-rear direction;
    a tail wing provided at a rear portion of the fuselage body in the front-rear direction;
    a main wing provided in front of the tail wing in the front-rear direction on the fuselage body; and
    fan devices provided on an outer surface of the fuselage body, wherein
    each of the fan devices includes:
        a rotor shaft disposed outside the outer surface of the fuselage body in a fuselage radial direction and provided to be rotatable around a central axis extending in the front-rear direction,
        a rotor blade provided on an outer side of the rotor shaft in a rotor radial direction with the rotor shaft as a center,
        a housing fixed to the fuselage body, extending in the front-rear direction, including respective openings at a front and a rear in the front-rear direction, and provided to cover the rotor shaft and the rotor blade,
        a stator blade including a stator blade tip portion and extending inward from an inner peripheral surface of the housing in the rotor radial direction to the stator blade tip portion of the stator blade, and
        stator blade fluid suction portions that suction a fluid on a stator blade tip portion side of the stator blade on an inner side of the rotor radial direction,
    the stator blade fluid suction portions are disposed at intervals in a rotor circumferential direction around the rotor shaft, and
    each of the stator blade fluid suction portions includes:
        a first opening portion that opens at the stator blade tip portion;
        a second opening portion that opens behind the fan devices in the front-rear direction; and
        a first flow path portion through which the first opening portion and the second opening portion communicate.

2. The aircraft according to claim 1, wherein the fan devices are provided at intervals in a fuselage circumferential direction along the outer surface of the fuselage body on an outer side of the fuselage body in the fuselage radial direction.

3. The aircraft according to claim 1, wherein an opening area of the first opening portion of the stator blade fluid suction portions disposed on a side closer to the fuselage body with respect to the rotor shaft is larger than an opening area of the first opening portion of the stator blade fluid suction portions disposed on a side farther from the fuselage body with respect to the rotor shaft.

4. The aircraft according to claim 1, further comprising:
    an opening-closing valve that intermittently interrupts suction of the fluid in the stator blade fluid suction portions.

5. The aircraft according to claim 1, further comprising:
    rotor blade fluid suction portions that suction the fluid inside the housing on an outer side of the rotor blade in the rotor radial direction.

6. The aircraft according to claim 5, wherein
    the rotor blade includes a rotor blade tip portion, and
    each of the rotor blade fluid suction portions includes:
        a third opening portion that opens to face the rotor blade tip portion in the rotor radial direction;
        a fourth opening portion that opens behind the third opening portion in the front-rear direction; and
        a second flow path portion through which the third opening portion and the fourth opening portion communicate.

* * * * *